United States Patent
Khamis et al.

(10) Patent No.: US 12,488,637 B2
(45) Date of Patent: Dec. 2, 2025

(54) ACCIDENT SEVERITY ESTIMATION SYSTEM FOR A VEHICLE

(71) Applicant: GM Global Technology Operations LLC, Detroit, MI (US)

(72) Inventors: Alaa M. Khamis, Courtice (CA); Ali Rafiei, Newmarket (CA); Chin-Hsu Lin, Troy, MI (US); Alok Warey, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 88 days.

(21) Appl. No.: 18/503,729

(22) Filed: Nov. 7, 2023

(65) Prior Publication Data

US 2025/0148840 A1 May 8, 2025

(51) Int. Cl.
| | | |
|---|---|---|
| G07C 5/02 | (2006.01) | |
| E05B 77/02 | (2014.01) | |
| E05F 15/72 | (2015.01) | |
| G06V 20/56 | (2022.01) | |
| G06V 20/59 | (2022.01) | |
| G10L 25/33 | (2013.01) | |
| G10L 25/51 | (2013.01) | |

(52) U.S. Cl.
CPC ............... *G07C 5/02* (2013.01); *E05B 77/02* (2013.01); *E05F 15/72* (2015.01); *G06V 20/56* (2022.01); *G06V 20/59* (2022.01); *G10L 25/33* (2013.01); *G10L 25/51* (2013.01); *E05Y 2900/55* (2013.01)

(58) Field of Classification Search
CPC ............ G07C 5/02; E05B 77/02; E05F 15/72; G06V 20/56; G06V 20/59; G10L 25/33; G10L 25/51; E05Y 2900/55

USPC ........................................................ 701/29.2
See application file for complete search history.

(56) References Cited

U.S. PATENT DOCUMENTS

| | | | |
|---|---|---|---|
| 9,646,428 B1* | 5/2017 | Konrardy | G06Q 10/0635 |
| 11,518,330 B2 | 12/2022 | Park et al. | |
| 12,246,708 B2 | 3/2025 | Nave et al. | |
| 2004/0148188 A1* | 7/2004 | Uegaki | G06Q 10/06 |
| | | | 705/305 |
| 2007/0203866 A1* | 8/2007 | Kidd | G06N 5/025 |
| | | | 706/47 |
| 2012/0146766 A1 | 6/2012 | Geisler et al. | |
| 2015/0035665 A1* | 2/2015 | Plante | B60K 35/00 |
| | | | 340/438 |

(Continued)

FOREIGN PATENT DOCUMENTS

DE 102017103969 A1 8/2017

*Primary Examiner* — Tyler D Paige
(74) *Attorney, Agent, or Firm* — Vivacqua Crane, PLLC

(57) ABSTRACT

An accident severity estimation system for estimating the severity of an accident for a vehicle includes one or more microphones that capture a plurality of audio-based inputs indicative of verbal and non-verbal sounds emitted by one or more occupants of the vehicle. The accident severity estimation system also includes a vision system that captures a plurality of vision-based inputs representing image data indicative of the occupants, a motion-based input system that collects a plurality of motion-based inputs indicative of the motion of the vehicle during the accident, a thermal incident system that collects a plurality of thermal inputs indicative of thermal events within the vehicle, a propulsion system that provides a status-based input of the propulsion system of the vehicle, and one or more controllers.

18 Claims, 6 Drawing Sheets

(56) References Cited

U.S. PATENT DOCUMENTS

| | | | |
|---|---|---|---|
| 2019/0279447 A1* | 9/2019 | Ricci | B60R 25/01 |
| 2019/0370576 A1* | 12/2019 | Surendran | B60R 21/01538 |
| 2020/0372727 A1* | 11/2020 | Sudhir | G08B 25/016 |
| 2023/0256903 A1* | 8/2023 | Gilbert-Eyres | B60R 21/01538 |
| | | | 340/438 |
| 2023/0316784 A1* | 10/2023 | Damodharan | G06Q 50/26 |
| | | | 382/100 |
| 2024/0059323 A1* | 2/2024 | Gerrese | H04W 4/023 |
| 2025/0143645 A1* | 5/2025 | Rafiei | A61B 5/0077 |
| 2025/0148840 A1* | 5/2025 | Khamis | G10L 25/51 |

* cited by examiner

ACCIDENT SEVERITY ESTIMATION SYSTEM FOR A VEHICLE

INTRODUCTION

The present disclosure relates to an accident severity estimation system for estimating the severity of an accident a vehicle undergoes. The accident severity estimation system also selects one or more remedial actions to perform based on the severity of the accident.

There are various remedial actions that may be performed after a vehicle undergoes an accident, such as a collision, that assists the occupants of a vehicle. For example, if the vehicle is involved in a relatively minor collision that does not affect the occupants, then non-emergency personnel may be contacted by a subscription-based vehicle communication system. In contrast, if the collision is more severe, then emergency personnel may be contacted in addition to the non-emergency personnel. In some situations, the doors are unlocked, or the windows are lowered after the vehicle undergoes an accident.

It is to be appreciated that some types of remedial actions may be more appropriate or helpful when compared to some other types of remedial actions that are performed after a vehicle undergoes an accident, depending upon the specific details as well as the severity of the collision. For example, it may not be particularly helpful or necessary to contact emergency personnel for a relatively minor collision. As another example, in some situations it may not be especially helpful to lower the windows of the vehicle, such as when the vehicle is in a body of water. As another example, it may be especially helpful to unlock the doors of the vehicle, such as when smoke is present within the interior cabin.

Thus, while current accident response systems achieve their intended purpose, there is a need in the art for an improved approach for determining remedial actions that may be performed after a vehicle undergoes a collision.

SUMMARY

According to several aspects, an accident severity estimation system for estimating the severity of an accident for a vehicle is disclosed, and includes one or more microphones that capture a plurality of audio-based inputs indicative of verbal and non-verbal sounds emitted by one or more occupants of the vehicle, a vision system that captures a plurality of vision-based inputs representing image data indicative of the occupants, a motion-based input system that collects a plurality of motion-based inputs indicative of the motion of the vehicle during the accident, a thermal incident system that collects a plurality of thermal inputs indicative of thermal events within the vehicle, a propulsion system that provides a status-based input of the propulsion system of the vehicle, and one or more controllers in electronic communication with the one or more microphones, the vision system, the motion-based input system, the thermal incident system, and the propulsion system. The one or more controllers execute instructions to combine the plurality of audio-based inputs based on at least a 2-value logic system to determine an audio-based indicator, the plurality of vision-based inputs based on the at least 2-value logic system to determine a vision-based indicator, and the plurality of thermal inputs based on the at least 2-value logic system to determine a thermal-based indicator. The one or more controllers combine the plurality of motion-based inputs from the motion-based input system based on a weighted sum model to determine a motion-based indicator. The one or more controllers determine a propulsion-based indicator based on the status-based input. The one or more controllers estimate the severity of the accident based on the audio-based indicator, the vision-based indicator, the thermal-based indicator, the motion-based indicator, and the propulsion-based indicator.

In another aspect, the one or more controllers execute instructions to estimate the severity of the accident the vehicle undergoes based on comparing values for the audio-based indicator, the vision-based indicator, the motion-based indicator, the thermal-based indicator, and the propulsion-based indicator that are stored in a look-up table.

In yet another aspect, the one or more controllers execute instructions to estimate the severity of the accident based on a fuzzy logic severity estimation technique.

In an aspect, the fuzzy logic severity estimation technique includes assigning a corresponding fuzzy value to each indicator based on a membership function, evaluating the corresponding fuzzy value for each of the indicators based on one or more fuzzy logic rules to determine a fuzzified output value, where the fuzzified output value indicates the severity of the accident and a truth value corresponding to the severity, and converting the fuzzified output value into the severity of the accident based on the truth value.

In another aspect, the one or more controllers execute instructions to select one or more remedial actions based on the severity of the accident, a thermal incident indicator, a water incident indicator, and a root cause probability indicator.

In yet another aspect, the one or more remedial actions include one or more of the following: contacting emergency personnel, unlocking doors of the vehicle, lowering windows of the vehicle, sending an SOS signal to one or more vehicles that are located within a predefined radius from the vehicle, and contacting non-emergency personnel.

In an aspect, the propulsion system includes a battery pack that provides motive power to one or more electric motors.

In another aspect, the status-based input is a battery-based input indicating the health of the battery pack.

In yet another aspect, the propulsion system includes an internal combustion engine.

In an aspect, the status-based input includes an engine and location-based status input indicating a status of the internal combustion engine and a location input indicating a location of the vehicle.

In another aspect, the audio-based inputs include a non-speech-based input and a speech-based input.

In yet another aspect, the plurality of vision-based inputs include an in-vehicle input indicative of a visual status of the occupants within an interior cabin of the vehicle and out-vehicle input indicative of a visual status of an exterior of the vehicle and the occupants outside of the vehicle.

In an aspect, the thermal inputs include an in-cabin thermal input and an engine bay thermal input.

In another aspect, the plurality of motion-based inputs include one or more of the following: an acceleration and deceleration input, an impact angle input, a roll-over input, and a velocity change input.

In an aspect, the weighted sum model is expressed as:

$$I_{motion} = \omega_{M1} \times M1 + \omega_{M2} \times M2 + \omega_{M3} \times M3 + \omega_{M4} \times M4 = 1$$

where $\omega_{M1}$ represents a first weighting factor corresponding to the acceleration and deceleration input M1, $\omega_{M2}$ represents a second weighting factor corresponding to the impact angle input M2, $\omega_{M3}$ represents a third weighting factor corresponding to the roll-over input M3, and $\omega_{M1}$ represents a fourth weighting factor corresponding to the velocity change input M4.

In another aspect, the 2-value logic system is one of a binary logic system and a ternary logic system.

In yet another aspect, an accident severity estimation system for estimating the severity of an accident for a vehicle is disclosed, and includes one or more microphones that capture a plurality of audio-based inputs indicative of verbal and non-verbal sounds emitted by one or more occupants of the vehicle, a vision system that captures a plurality of vision-based inputs representing image data indicative of the occupants, a motion-based input system that collects a plurality of motion-based inputs indicative of the motion of the vehicle during the accident, a thermal incident system that collects a plurality of thermal inputs indicative of thermal events within the vehicle, a propulsion system that provides a status-based input of the propulsion system of the vehicle, and one or more controllers in electronic communication with the one or more microphones, the vision system, the motion-based input system, the thermal incident system, and the propulsion system. The one or more controllers execute instructions to combine the plurality of audio-based inputs based on at least a 2-value logic system to determine an audio-based indicator, the plurality of vision-based inputs based on the at least 2-value logic system to determine a vision-based indicator, and the plurality of thermal inputs based on the at least 2-value logic system to determine a thermal-based indicator. The one or more controllers combine the plurality of motion-based inputs from the motion-based input system based on a weighted sum model to determine a motion-based indicator. The one or more controllers determine a propulsion-based indicator based on the status-based input and estimate the severity of the accident based on the audio-based indicator, the vision-based indicator, the thermal-based indicator, the motion-based indicator, and the propulsion-based indicator based on a fuzzy logic severity estimation technique.

In another aspect, the fuzzy logic severity estimation technique includes assigning a corresponding fuzzy value to each indicator based on a membership function, evaluating the corresponding fuzzy value for each of the indicators based on one or more fuzzy logic rules to determine a fuzzified output value, where the fuzzified output value indicates the severity of the accident and a truth value corresponding to the severity, and converting the fuzzified output value into the severity of the accident based on the truth value.

In yet another aspect, the one or more controllers execute instructions to select one or more remedial actions based on the severity of the accident, a thermal incident indicator, a water incident indicator, and a root cause probability indicator.

In an aspect, an accident severity estimation system for estimating the severity of an accident for a vehicle is disclosed, and includes one or more microphones that capture a plurality of audio-based inputs indicative of verbal and non-verbal sounds emitted by one or more occupants of the vehicle, a vision system that captures a plurality of vision-based inputs representing image data indicative of the occupants, a motion-based input system that collects a plurality of motion-based inputs indicative of the motion of the vehicle during the accident, a thermal incident system that collects a plurality of thermal inputs indicative of thermal events within the vehicle, a propulsion system that provides a status-based input of the propulsion system of the vehicle, and one or more controllers in electronic communication with the one or more microphones, the vision system, the motion-based input system, the thermal incident system, and the propulsion system. The one or more controllers execute instructions to combine the plurality of audio-based inputs based on at least a 2-value logic system to determine an audio-based indicator, the plurality of vision-based inputs based on the at least 2-value logic system to determine a vision-based indicator, and the plurality of thermal inputs based on the at least 2-value logic system to determine a thermal-based indicator. The one or more controllers combine the plurality of motion-based inputs from the motion-based input system based on a weighted sum model to determine a motion-based indicator. The one or more controllers determine a propulsion-based indicator based on the status-based input and estimate the severity of the accident based on the audio-based indicator, the vision-based indicator, the thermal-based indicator, the motion-based indicator, and the propulsion-based indicator based on a fuzzy logic severity estimation technique. The fuzzy logic severity estimation technique includes assigning a corresponding fuzzy value to each indicator based on a membership function, evaluating the corresponding fuzzy value for each of the indicators based on one or more fuzzy logic rules to determine a fuzzified output value, wherein the fuzzified output value indicates the severity of the accident and a truth value corresponding to the severity, and converting the fuzzified output value into the severity of the accident based on the truth value.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
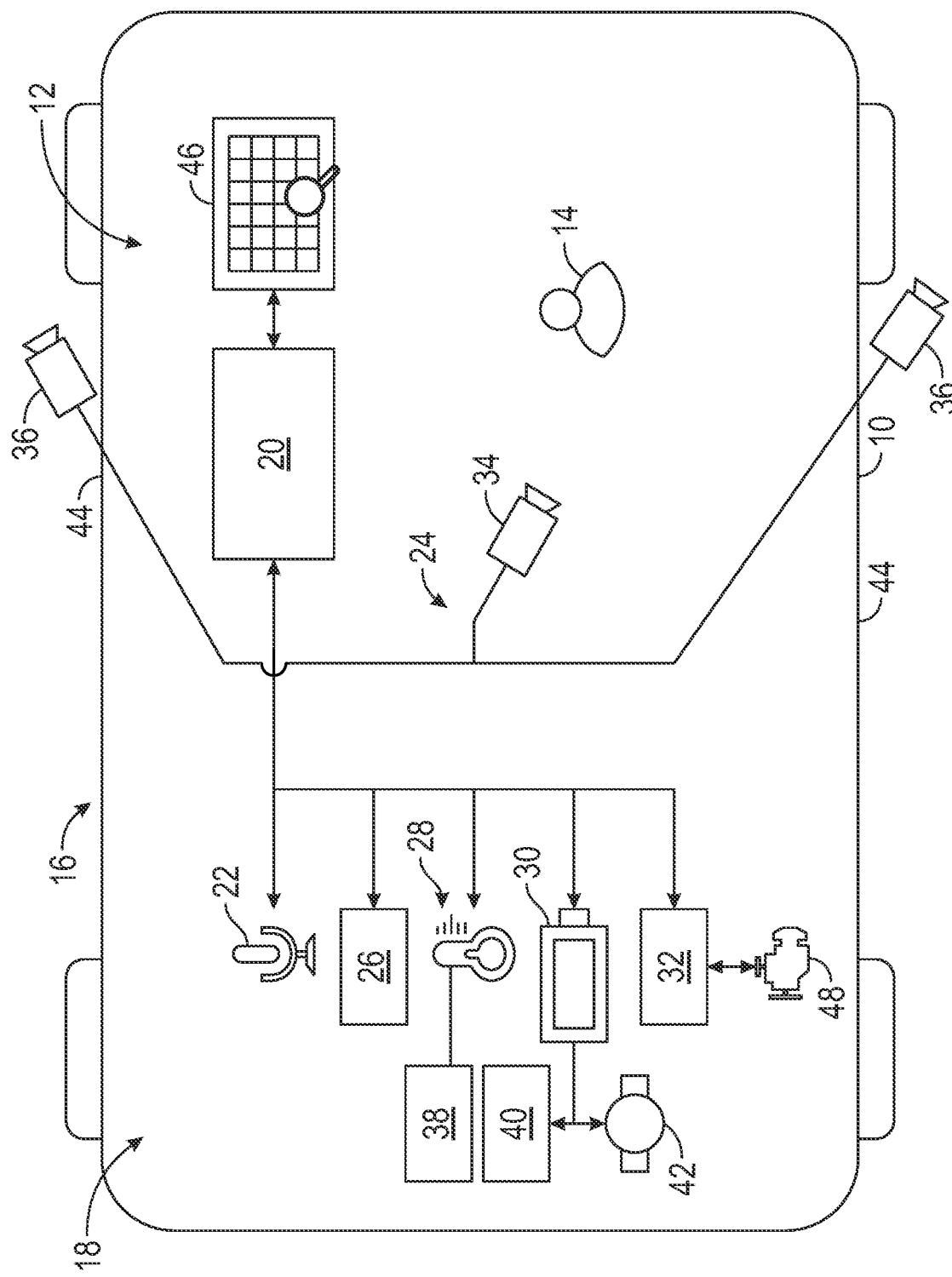
FIG. 1 illustrates a schematic diagram of vehicle including the disclosed severity estimation system including one or more controllers in electronic communication with a microphone, a vision system, a motion-based indicator system, a thermal incident system, a battery management system, and an engine status system, according to an exemplary embodiment.

Referring to FIG. 1, a vehicle 10 including the disclosed accident severity estimation system 12 is illustrated. As explained below, the accident severity estimation system 12 employs a multi-modal approach for estimating the severity of an accident the vehicle 10 undergoes. It is to be appreciated that the vehicle 10 may be any type of vehicle such as, but not limited to, a sedan, a truck, sport utility vehicle, van, or motor home. In the non-limiting embodiment as shown in FIG. 1, the vehicle 10 includes one or more controllers 20 in electronic communication with one or more microphones 22, a vision system 24, a motion-based indicator system 26, a thermal incident system 28, a battery management system 30, and an engine status system 32 that are located within the interior cabin 18 of the vehicle 10.

As explained below, the one or more controllers 20 estimate the severity of an accident that the vehicle 10 undergoes and select one or more remedial actions based on the severity of the accident. In embodiments, the accident may refer to an event the vehicle 10 undergoes that is unintentional (either by the driver or by an autonomous driving system of the vehicle 10). Merely by way of example, the accident may refer to a rollover incident, a malfunction of the vehicle 10, a collision between the vehicle 10 and another vehicle located in the surrounding environment, a collision between the vehicle 10 and an object located in the surrounding environment such as, for example, a traffic sign, a pole, or a tree.

The one or more microphones 22 are positioned within the interior cabin 18 of the vehicle 10 as well as an exterior 16 of the vehicle 10 to capture audio signals. The vision system 24 includes one or more cameras 34 positioned within the interior cabin 18 of the vehicle 10 to capture image data indicative of the occupants 14, and one or more cameras 36 positioned along the exterior sides 44 of the vehicle 10 to capture image data of the occupants 14 placing their extremities outside of the interior cabin 18. For example, an occupant 14 may place his or her hand or arm outside a window. The motion-based indicator system 26 includes one or more diagnostic controllers that record motion-based data of the vehicle 10 during the accident. The motion-based data includes, for example, acceleration data and pressure measurements. In embodiments, the motion-based indicator system 26 includes one or more sensing and diagnostic modules (SDM) and/or one or more electronic data recorders (EDM) that record the motion-based data of the vehicle 10. The thermal incident system 28 includes a plurality of sensors 38 that monitor the exterior 16 and the interior cabin 18 of the vehicle 10 to determine a temperature and an engine bay to determine an engine bay temperature.

The controllers 20 receives a status-based input from a propulsion system of the vehicle 10. It is to be appreciated that in one embodiment, the propulsion system is a battery pack 40 that provides motive power to one or more electric motors 42 and the status-based input is indicative of the health of the battery pack 40. In one embodiment, the battery management system 30 is a wireless battery management system (wBMS). Alternatively, in another embodiment, the propulsion system is an internal combustion engine 48 and the status-based input indicates a status of the internal combustion engine 48 (e.g., on or off) and the vehicle status location to the one or more controllers 20. The vehicle status location indicates a location of the vehicle 10, where the location may indicate if the vehicle 10 is pulled over, on the road, or parked.

Figure 2:
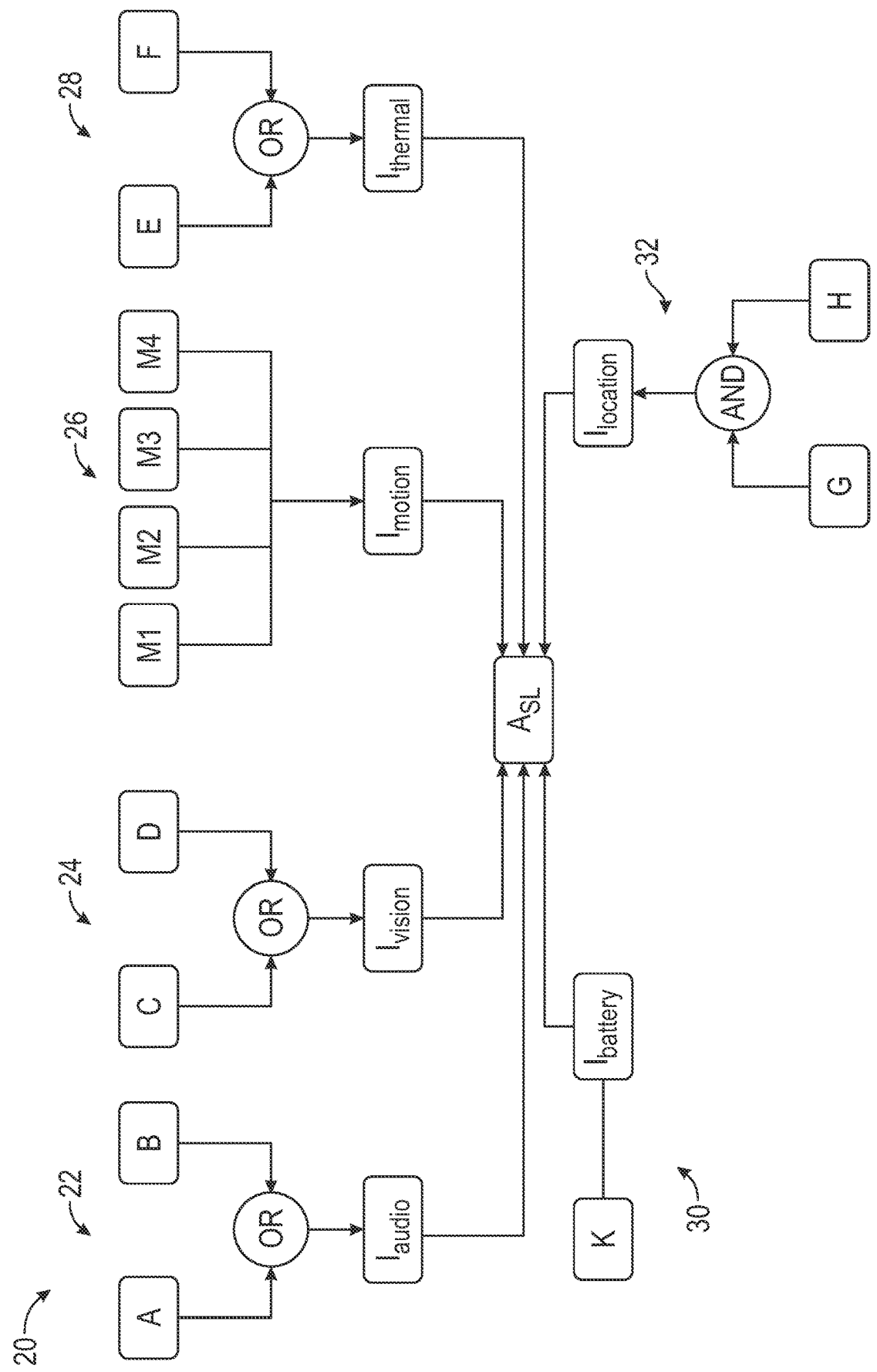
FIG. 2 is a schematic diagram of the one or more controllers receiving input from the microphone, the vision system, the motion-based indicator system, the thermal incident system, the battery management system, and the engine status system, according to an exemplary embodiment.

FIG. 2 is a schematic diagram illustrating the one or more controllers 20 receiving a plurality of audio-based inputs A, B from the microphone 22, a plurality of vision-based inputs C, D from the vision system 24, a plurality of motion-based inputs M1-M4 from the motion-based indicator system 26, a plurality of thermal inputs E, F from the thermal incident system 28, a battery-based input K from the battery management system 30, and a plurality of engine and location-based indicators G, H from the engine status system 32. Referring to both FIGS. 1 and 2, the microphone 22 is located within the interior cabin 18 of the vehicle 10 and captures the audio-based inputs A, B indicative of verbal and non-verbal sounds emitted by the occupants 14 of the vehicle 10. The vision system 24 includes one or more cameras 34, 36 for capturing a plurality of vision-based inputs C, D that represent image data indicative of the occupants 14. The motion-based indicator system 26 collects the plurality of motion-based inputs M1-M4 indicative of the motion of the vehicle 10 during the accident. The thermal incident system 28 collects the thermal inputs E, F that indicate thermal events within the interior cabin 18 and the engine bay of the vehicle 10. The thermal events refer to the presence of smoke or flames.

In one embodiment, the vehicle 10 is an electric vehicle and the battery management system 30 provides the battery-based input K to the one or more controllers 20 indicating the health of the battery pack 40 of the vehicle 10. Alternatively, in another embodiment, the vehicle 10 is propelled by the internal combustion engine 48 and the engine status system 32 provides a plurality of engine and location-based inputs G, H indicating the status of the internal combustion engine 48 and the vehicle status location to the one or more controllers 20.

As explained below, the one or more controllers 20 combine the plurality of audio-based inputs A, B from the microphone 22 based on at least a 2-value logic system to determine an audio-based indicator $I_{audio}$. In one embodiment, the 2-value logic system refers to either a binary logic system or a ternary logic system. The one or more controllers 20 combine the vision-based inputs C, D from the vision system 24 based on the at least 2-value logic system to determine a vision-based indicator $I_{vision}$. The one or more controllers 20 combine the plurality of motion-based inputs M1-M4 from the motion-based indicator system 26 based on a weighted sum model to determine a motion-based indicator $I_{motion}$. The one or more controllers 20 combine the thermal inputs E, F from the thermal incident system 28 based on the at least 2-value logic system to determine a thermal-based indicator $I_{thermal}$. In one embodiment, the propulsion system includes the battery pack 40 and the electric motors 42, and the one or more controllers 20 determine a propulsion-based indicator, which is a battery-based indicator $I_{battery}$, based on the battery-based input K from the battery pack 40 of the vehicle 10. In another embodiment, the propulsion system includes an internal combustion engine 48 and the one or more controllers 20 combine the plurality of engine and location-based inputs G, H from the internal combustion engine 48 based on the at least a 2-value logic system to determine the propulsion-based indicator, which is an engine and location-based indicator $I_{location}$.

As also explained below, the one or more controllers 20 estimate the severity $A_{SL}$ of the accident the vehicle 10 undergoes based on the audio-based indicator $I_{audio}$, the vision-based indicator $I_{vision}$, the motion-based indicator $I_{motion}$, the thermal-based indicator $I_{thermal}$, the battery-based indicator $I_{battery}$, and the engine and location-based indicator $I_{location}$. In one embodiment, the one or more controllers 20 estimate the severity $A_{SL}$ of the accident the vehicle 10 undergoes based on a look-up table 46 (shown in FIG. 1). In an embodiment, the look-up table 46 is stored in memory of the one or more controllers 20. The severity $A_{SL}$ of the accident is estimated based on the values stored in the look-up table 46 for the audio-based indicator $I_{audio}$, the vision-based indicator $I_{vision}$, the motion-based indicator $I_{motion}$, the thermal-based indicator $I_{thermal}$, the battery-based indicator $I_{battery}$, and the engine and location-based indicator $I_{location}$. Alternatively, in another embodiment, the severity $A_{SL}$ of the accident the vehicle 10 undergoes is determined based on a fuzzy logic severity estimation technique. The severity $A_{SL}$ indicates a level of severity of the accident.

Referring to both FIGS. 1 and 2, in the exemplary embodiment as shown, the audio-based inputs include a non-speech-based input A and a speech input B. The non-speech input A represents sounds that are not words generated by the occupants 14 such as crying, moaning, respiration noises, or the sound of the occupant 14 making impact with the interior of the vehicle 10. The speech-based input B represents speech-based sounds generated by the occupants 14 such as, for example, asking for assistance or expressing emotions such as fear, surprise, or shock.

Figure 3:
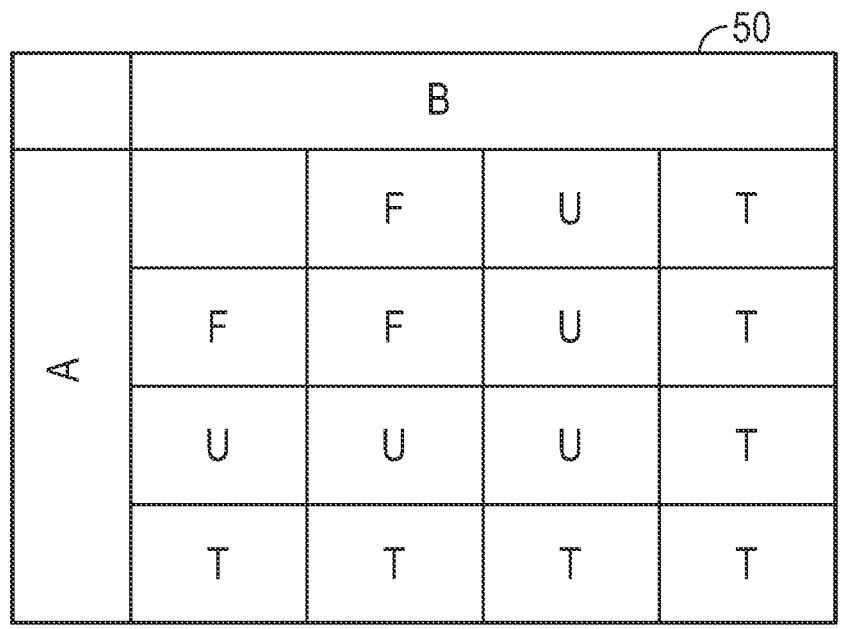
FIG. 3 illustrates a ternary logic OR table for combining two audio-based inputs, according to an exemplary embodiment.

In one embodiment, the one or more controllers 20 employ three-value or ternary logic to combine the audio-based inputs A, B with one another to determine the audio-based indicator $I_{audio}$. For example, as seen in FIG. 3, a ternary logic OR table 50 is illustrated, where the audio-based inputs A, B are combined based on ternary OR-based logic. The table 50 indicates a truth value of either true, which is indicated by a T, false, which is indicated by a F, and unknown, which is indicated by a U. In the example as shown in FIG. 3, when the truth value is false, this indicates the microphone 22 did not detect any non-speech-based sounds corresponding to the non-speech-based input A. Similarly, the truth value of false also indicates the microphone 22 did not detect any speech-based sounds corresponding to the speech-based input B. The unknown truth value indicates no signal was detected by the microphone 22. It is to be appreciated that while ternary logic is described, in another embodiment binary logic may be used instead to combine the audio-based inputs A, B with one another to determine the audio-based indicator $I_{audio}$. It is to be appreciated that while the disclosure only illustrates a ternary logic OR table 50 for combining the audio-based inputs A, B, a ternary logic table may be provided to combine the vision-based inputs C, D from the vision system 24, the thermal inputs E, F from the thermal incident system 28, and the plurality of engine and location-based inputs G, H as well.

Referring to both FIGS. 1 and 2, in the exemplary embodiment as shown, the vision-based inputs C, D from the vision system 24 include an in-vehicle input C indicative of a visual status of the occupants 14 within the interior cabin 18 of the vehicle 10. The in-vehicle input C may indicate events such as, but not limited to, evidence of a collision and the consciousness of the occupants 14. An out-vehicle input D is indicative of a visual status of the exterior 16 of the vehicle 10 and the occupants 14 outside of the vehicle 10. For example, the out-vehicle input D may indicate when an occupant 14 is placing his or her hand out a window of the vehicle 10. In one non-limiting embodiment, the one or more controllers 20 employ a ternary logic OR table to combine the in-vehicle input C and the out-vehicle input D with one another to determine the vision-based indicator $I_{vision}$.

In the exemplary embodiment as shown, the plurality of motion-based inputs includes an acceleration and deceleration input M1, an impact angle input M2, a roll-over input M3, and a velocity change input M4. The acceleration and deceleration input M1 indicates an acceleration or a deceleration the vehicle 10 experienced during the accident. The impact angle input M2 indicates an impact angle and an impact direction where the vehicle 10 is impacted during the accident. The roll-over input M3 indicates if the vehicle 10 has experienced roll-over during the accident. Finally, the velocity change input M4 indicates a change in velocity of the vehicle 10 over a time window during the accident.

In one embodiment the one or more controllers 20 combine the acceleration and deceleration input M1, the impact angle input M2, the roll-over input M3, and the velocity change input M4 together based on a weighted sum model to determine the motion-based indicator $I_{motion}$. In one non-limiting embodiment, the weighted sum model is expressed in Equation 1 as:

$$I_{motion} = \omega_{M1} \times M1 + \omega_{M2} \times M2 + \omega_{M3} \times M3 + \omega_{M4} \times M4 \quad \text{Equation 1}$$

where the weighted sum model includes a unique weighting factor for each motion-based input and are each ranked based on a level of importance. In another embodiment, the weighted sum model includes unique weighting factors for each motion-based input that indicate a degree of certainty quantified as a function of variance. Specifically, $\omega_{M1}$ represents a first weighting factor corresponding to the acceleration and deceleration input M1, $\omega_{M2}$ represents a second weighting factor corresponding to the impact angle input M2, $\omega_{M3}$ represents a third weighting factor corresponding to the roll-over input M3, and $\omega_{M1}$ represents a fourth weighting factor corresponding to the velocity change input M4 (in a time window), where the sum of the first weighting factor, the second weighting factor, the third weighting factor, and the fourth weighting factor is equal to 1.

Referring to both FIGS. 1 and 2, in the exemplary embodiment as shown, the thermal inputs E, F from the thermal incident system 28 include an in-cabin temperature or thermal input E and an engine bay thermal input F. The in-cabin thermal input E indicates the presence of a thermal incident within the interior cabin 18. The engine bay input F indicates the presence of a thermal incident in the engine bay of the vehicle 10. In one embodiment, the one or more controllers 20 employ ternary logic to combine the plurality of thermal inputs E, F with one another to determine the thermal-based indicator $I_{thermal}$.

Figure 4:
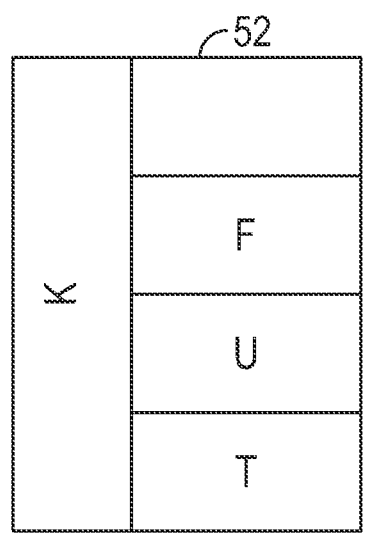
FIG. 4 illustrates a table indicating ternary logic to determine a battery-based indicator, according to an exemplary embodiment.

Referring to both FIGS. 1 and 2, in the exemplary embodiment as shown, the battery-based input K from the battery pack 40 of the vehicle 10 indicates the health of the battery pack 40 of the vehicle 10. As seen in FIG. 4, in one non-limiting embodiment a table 52 is illustrated indicating ternary logic to determine the battery-based indicator $I_{battery}$. Since there is only a single input K, the one or more controllers 20 determine the battery-based indicator $I_{battery}$ based on a truth value of the battery-based input K. For example, if the battery management system 30 indicates the battery pack 40 is not functioning normally, then the truth value is false. If the battery management system 30 indicates the battery pack 40 is functioning normally, then the truth value is true. If there is no signal received from the battery management system 30, then the truth value is unknown.

Referring to both FIGS. 1 and 2, in the exemplary embodiment as shown, the engine status system 32 provides the plurality of engine and location-based inputs G, H including an engine status input G and a location input H. The engine status input G indicates the status (e.g., on or off) of the internal combustion engine 48. The location input H indicates the location of the vehicle 10. In one non-limiting embodiment, the one or more controllers 20 employ a ternary logic AND table to combine the engine status input G and the location input H with one another to determine the engine and location-based indicator $I_{location}$.

Referring to FIGS. 1 and 2, in one embodiment the one or more controllers 20 estimate the severity $A_{SL}$ of the accident the vehicle 10 undergoes based on comparing values for the audio-based indicator $I_{audio}$, the vision-based indicator $I_{vision}$, the motion-based indicator $I_{motion}$, the thermal-based indicator $I_{thermal}$, the battery-based indicator $I_{battery}$, and the engine and location-based indicator $I_{location}$ that are stored in the look-up table 46 (shown in FIG. 1). As an example, if the values in the look-up table 46 corresponding to each of the indicators (i.e., the audio-based indicator $I_{audio}$, the vision-based indicator $I_{vision}$, the motion-based indicator $I_{motion}$, the thermal-based indicator $I_{thermal}$, the battery-based indicator $I_{battery}$, and the engine and location-based indicator $I_{location}$ are unknown, then the one or more controllers 20 determine the severity $A_{SL}$ is unknown. If all the values for the indicators state no incident (e.g., false), then the severity $A_{SL}$ indicates no incident. If one indicator in the look-up table 46 states an incident (e.g., true), then the severity $A_{SL}$ indicates the level of severity of the accident is low. One example of an accident with low severity is when the airbags are not deployed, the occupant 14 is normal and does not generate sounds or eye motion that indicate an accident, and the motion-based indicator system 26 records a higher acceleration than what is normally experienced (e.g., 2 g-force). Finally, if at least two indicators in the look-up table state an incident, then the severity $A_{SL}$ indicates the level of severity of the accident is high. One example of an accident with high severity is when the airbags are deployed (both first and second stage), no occupant motion is detected, and the motion-based indicator system 26 records an acceleration of about 30 g-force.

Figure 5:
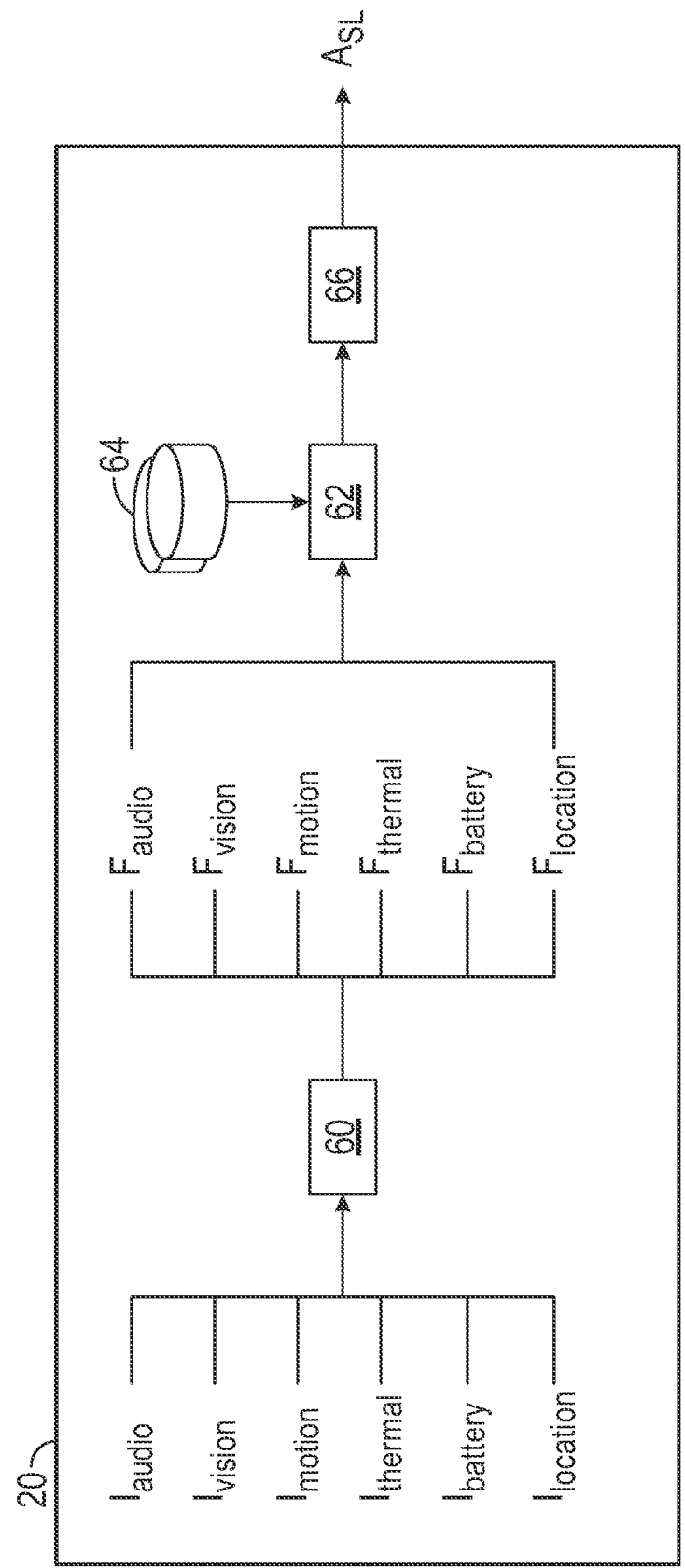
FIG. 5 illustrates a fuzzy logic severity estimation technique performed by the one or more controllers shown in FIG. 1, according to an exemplary embodiment.

Alternatively, in another embodiment, the severity $A_{SL}$ of the accident the vehicle 10 undergoes is estimated based on a fuzzy logic severity estimation technique, which is shown in FIG. 5. Referring to FIG. 5, the one or more controllers 20 include a fuzzification block 60, a fuzzy inference block 62, one or more fuzzy rules databases 64, and a defuzzification block 66. The fuzzification block 60 of the one or more controllers 20 assigns a corresponding fuzzy value to each of the indicators (i.e., the audio-based indicator $I_{audio}$, the vision-based indicator $I_{vision}$, the motion-based indicator $I_{motion}$, the thermal-based indicator $I_{thermal}$, the battery-based indicator $I_{battery}$, and the engine and location-based indicator $I_{location}$) based on a membership function. Specifically, the fuzzy value for each indicator represents a degree of truth and ranges in value from 0 to 1.0. In the example as shown in FIG. 5, the fuzzy values include an audio-based fuzzy indicator $F_{audio}$, a vision-based fuzzy indicator $F_{vision}$, a motion-based fuzzy indicator $F_{motion}$, a thermal-based fuzzy indicator $F_{thermal}$, a battery-based fuzzy indicator $F_{battery}$, and an engine and location-based fuzzy indicator $F_{location}$.

The fuzzy inference block 62 of the one or more controllers 20 receive the corresponding fuzzy values for each of the indicators as input and evaluates the corresponding fuzzy values for each of the indicators based on one or more fuzzy logic rules that are stored in the one or more fuzzy rules database 64 to determine a fuzzified output value. The fuzzified output value indicates the severity $A_{SL}$ of the accident the vehicle 10 undergoes and a truth value corresponding to the severity $A_{SL}$. The defuzzification block 66 converts the fuzzified output value into a crisp value based on the truth value. Specifically, the crisp value is the severity $A_{SL}$ of the accident. Specifically, the defuzzification block 66 determines the severity $A_{SL}$ of the accident indicated by the fuzzified output value is correct when the truth value is at least a threshold value. In an embodiment, the threshold value is fifty percent, or 0.5.

Figure 6:
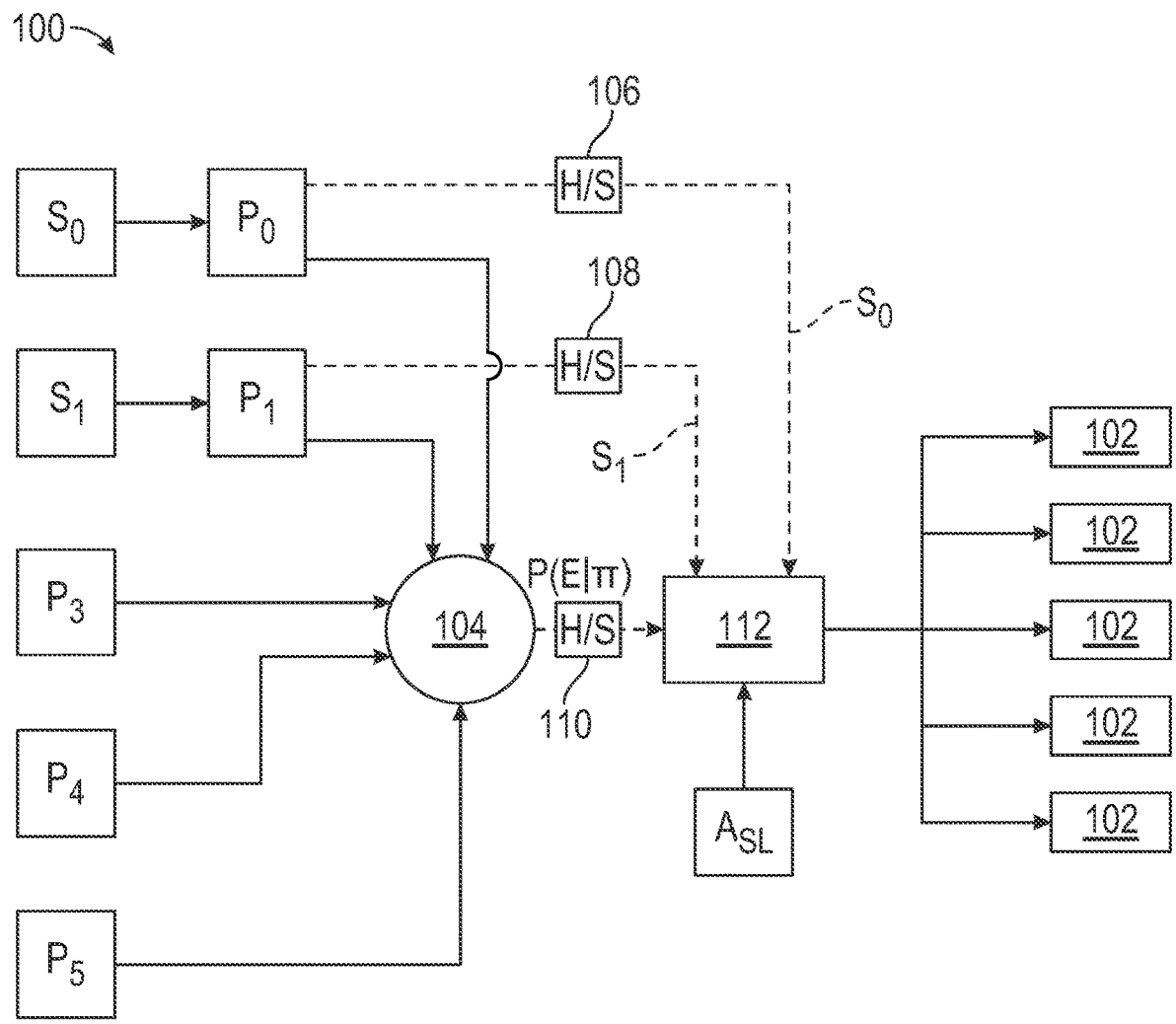
FIG. 6 is a diagram illustrating a cause-action map for selecting one or remedial actions by the one or more controllers, according to an exemplary embodiment.

FIG. 6 is a diagram illustrating a cause-action map 100 for selecting the one or remedial actions 102. Referring to FIGS. 1 and 6, in an embodiment the one or more controllers 20 selects one or more remedial actions 102 based on the severity $A_{SL}$ of the accident the vehicle 10 undergoes corresponding to the one or more occupants 14. The one or more remedial actions 102 represent activities that assist the one or more occupants 14 of the vehicle 10 after the accident. Some examples of the remedial actions 102 include, but are not limited to, contacting emergency personnel, unlocking the doors of the vehicle 10, lowering the windows of the vehicle 10, sending an SOS signal to one or more vehicles that are located within a predefined radius from the vehicle 10, and contacting non-emergency personnel.

In one non-limiting embodiment, the one or more controllers 20 select one or more remedial actions 102 based on the severity $A_{SL}$ of the accident the vehicle 10 undergoes, a thermal incident indicator $S_0$, a water incident indicator $S_1$, and a root cause probability indicator $P(E|\pi)$. The thermal incident indicator $S_0$ indicates thermal events are experienced within the interior cabin 18 and the engine bay of the vehicle 10. The water incident indicator $S_1$ indicates the vehicle 10 is in a body of water such as a lake or a river. The cause-action map 100 shown in FIG. 6 includes a hard/soft thresholding block 106 corresponding to the thermal incident indicator $S_0$, a hard/soft thresholding block 108 corresponding to the water incident indicator $S_1$, and a hard/soft thresholding block 110 for the root cause probability indicator $P(E|\pi)$. In one non-limiting embodiment, the one or more controllers 20 determine the thermal events occur when the thermal incident indicator $S_0$ is equal to or greater than 0.5. Similarly, the one or more controllers 20 determine the vehicle 10 is in a body of water when the water incident indicator $S_1$ is equal to or greater than 0.5. The cause-action map 100 also includes a cause-action mapping block 112 that receives the thermal incident indicator $S_0$, the water incident indicator $S_1$, the root cause probability indicator $P(E|\pi)$, and the severity $A_{SL}$ of the accident the vehicle 10, and performs cause-action mapping to determine the root cause of the accident.

The root cause probability indicator $P(E|\pi)$ indicates a probability that a root cause of the accident is true. In one non-limiting embodiment, the root cause probability indicator $P(E|\pi)$ is based on a water incident probability $P_0$, a thermal incident probability $P_1$, a rollover probability $P_2$, a malfunctioning probability $P_3$, and a high-impact collision probability $P_5$. The water incident probability $P_0$ indicates a probability the root cause of the accident is because the vehicle 10 is in a body of water, the thermal incident probability $P_1$ indicates a probability the root cause of the accident is smoke or flame present within the vehicle 10, the rollover probability $P_2$ indicates a probability the root cause of the accident is because vehicle 10 experienced a rollover, the malfunctioning probability $P_3$ indicates a probability the root cause of the accident is because the vehicle 10 experienced a malfunction of one or more systems, and the high-impact collision probability $P_5$ indicates a probability the root cause of the accident is the vehicle 10 undergoing a high-impact collision. The water incident probability $P_0$, the thermal incident probability $P_1$, the rollover probability $P_2$, the malfunctioning probability $P_3$, and the high-impact collision probability $P_5$ are combined in a noisy OR-model 104. In one embodiment, the root cause probability indicator $P(E|\pi)$ is determined based on Equation 2 as:

$$Prob(E_1 \mid \pi: \text{range over all parents of } E) = \prod_{\pi_i \in S} P_i \quad \text{Equation 2}$$

where S presents the set of parents that are true (on) and $\pi_i$ includes a range that includes all parents of the expected value E, and $Prob(E_0|\pi)=1-Prob(E_1|\pi)=1-P_1, P_2, \ldots, P_n=1-[(1-Q_1)(1-Q_2)\ldots(1-Q_n)]$, $P_i+Q_i=1(\forall i)$, $E_1+E_0=1$, where n=5 and in the present example (e.g., $P_1, P_2, P_3, P_4, P_5$) and represents the number of potential root causes.

In one non-limiting embodiment, the root cause of the accident may be one or more of the following: a rollover incident, a malfunctioning incident where one or more vehicle systems are not functioning normally, and a high-impact collision. In one non-limiting embodiment, the one or more controllers 20 determine the root cause is true when the root cause probability indicator $P(E|\pi)$ is equal to or greater than 0.5. As an example, when the severity $A_{SL}$ of the accident the vehicle 10 undergoes is high, the thermal incident indicator $S_0$ is true, the water incident indicator $S_1$ is false, and the root cause probability indicator $P(E|\pi)$ indicates none of the root causes are true, the one or more controllers 20 select contacting emergency personnel, sending an SOS signal to one or more vehicles that are located within the predefined radius from the vehicle 10, and contacting non-emergency personnel as the remedial actions.

Referring generally to the figures, the disclosed accident severity estimation system provides various technical effects and benefits. Specifically, the accident severity estimation system employs a multi-modal approach for estimating the severity of an accident. The severity may be used to select one or more remedial actions that aid the occupants after the accident has occurred. In other words, the disclosed accident severity estimation system may select remedial actions based on the severity of the accident, which may result in more appropriate or helpful actions being performed to assist the occupants after an accident.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An accident severity estimation system for estimating the severity of an accident for a vehicle, the accident severity estimation system comprising:
   one or more microphones that capture a plurality of audio-based inputs indicative of verbal and non-verbal sounds emitted by one or more occupants of the vehicle;
   a vision system that captures a plurality of vision-based inputs representing image data indicative of the occupants;
   a motion-based input system that collects a plurality of motion-based inputs indicative of the motion of the vehicle during the accident;
   a thermal incident system that collects a plurality of thermal inputs indicative of thermal events within the vehicle;
   a propulsion system that provides a status-based input of the propulsion system of the vehicle; and
   one or more controllers in electronic communication with the one or more microphones, the vision system, the motion-based input system, the thermal incident system, and the propulsion system, the one or more controllers executing instructions to:
      combine the plurality of audio-based inputs based on at least a 2-value logic system to determine an audio-based indicator, the plurality of vision-based inputs based on the at least 2-value logic system to determine a vision-based indicator, and the plurality of thermal inputs based on the at least 2-value logic system to determine a thermal-based indicator, wherein the 2-value logic system is one of a binary logic system and a ternary logic system;
      combine the plurality of motion-based inputs from the motion-based input system based on a weighted sum model to determine a motion-based indicator;
      determine a propulsion-based indicator based on the status-based input;
      estimate the severity of the accident based on the audio-based indicator, the vision-based indicator, the thermal-based indicator, the motion-based indicator, and the propulsion-based indicator, wherein the severity of the accident is based at least in part on an amount of acceleration the vehicle experiences during the accident;
      determine one or more remedial actions based on at least the severity of the accident; and
      instruct the vehicle to execute the one or more remedial actions, wherein the one or more remedial actions include one or more of the following: contacting emergency personnel, unlocking doors of the vehicle, lowering windows of the vehicle, sending an SOS signal to one or more vehicles that are located within a predefined radius from the vehicle, and contacting non-emergency personnel.

2. The accident severity estimation system of claim 1, wherein the one or more controllers execute instructions to:
   estimate the severity of the accident the vehicle undergoes based on comparing values for the audio-based indicator, the vision-based indicator, the motion-based indicator, the thermal-based indicator, and the propulsion-based indicator that are stored in a look-up table.

3. The accident severity estimation system of claim 1, wherein the one or more controllers execute instructions to estimate the severity of the accident based on a fuzzy logic severity estimation technique.

4. The accident severity estimation system of claim 3, wherein the fuzzy logic severity estimation technique includes:
- assigning a corresponding fuzzy value to each indicator based on a membership function;
- evaluating the corresponding fuzzy value for each of the indicators based on one or more fuzzy logic rules to determine a fuzzified output value, wherein the fuzzified output value indicates the severity of the accident and a truth value corresponding to the severity; and
- converting the fuzzified output value into the severity of the accident based on the truth value.

5. The accident severity estimation system of claim 1, wherein the one or more controllers execute instructions to select one or more remedial actions based on the severity of the accident, a thermal incident indicator, a water incident indicator, and a root cause probability indicator.

6. The accident severity estimation system of claim 1, wherein the propulsion system includes a battery pack that provides motive power to one or more electric motors.

7. The accident severity estimation system of claim 6, wherein the status-based input is a battery-based input indicating a health of the battery pack.

8. The accident severity estimation system of claim 1, wherein the propulsion system includes an internal combustion engine.

9. The accident severity estimation system of claim 8, wherein the status-based input includes an engine and location-based status input indicating a status of the internal combustion engine and a location input indicating a location of the vehicle.

10. The accident severity estimation system of claim 1, wherein the audio-based inputs include a non-speech-based input and a speech-based input.

11. The accident severity estimation system of claim 1, wherein the plurality of vision-based inputs include an in-vehicle input indicative of a visual status of the occupants within an interior cabin of the vehicle and out-vehicle input indicative of a visual status of an exterior of the vehicle and the occupants outside of the vehicle.

12. The accident severity estimation system of claim 1, wherein the thermal inputs include an in-cabin thermal input and an engine bay thermal input.

13. The accident severity estimation system of claim 1, wherein the plurality of motion-based inputs include one or more of the following: an acceleration and deceleration input, an impact angle input, a roll-over input, and a velocity change input.

14. The accident severity estimation system of claim 13, wherein the weighted sum model is expressed as:

$$I_{motion} = \omega_{M1} \times M1 + \omega_{M2} \times M2 + \omega_{M_3} \times M_3 + \omega_{M_4} \times M4 = 1$$

wherein $\omega_{M1}$ represents a first weighting factor corresponding to the acceleration and deceleration input M1, $\omega_{M2}$ represents a second weighting factor corresponding to the impact angle input M2, $\omega_{M3}$ represents a third weighting factor corresponding to the roll-over input M3, and $\omega_{M1}$ represents a fourth weighting factor corresponding to the velocity change input M4, and wherein the sum of the first weighting factor, the second weighting factor, the third weighting factor, and the fourth weighting factor is equal to 1.

15. An accident severity estimation system for estimating the severity of an accident for a vehicle, the accident severity estimation system comprising:
- one or more microphones that capture a plurality of audio-based inputs indicative of verbal and non-verbal sounds emitted by one or more occupants of the vehicle;
- a vision system that captures a plurality of vision-based inputs representing image data indicative of the occupants;
- a motion-based input system that collects a plurality of motion-based inputs indicative of the motion of the vehicle during the accident;
- a thermal incident system that collects a plurality of thermal inputs indicative of thermal events within the vehicle;
- a propulsion system that provides a status-based input of the propulsion system of the vehicle; and
- one or more controllers in electronic communication with the one or more microphones, the vision system, the motion-based input system, the thermal incident system, and the propulsion system, the one or more controllers executing instructions to:
  - combine the plurality of audio-based inputs based on at least a 2-value logic system to determine an audio-based indicator, the plurality of vision-based inputs based on the at least 2-value logic system to determine a vision-based indicator, and the plurality of thermal inputs based on the at least 2-value logic system to determine a thermal-based indicator, wherein the 2-value logic system is one of a binary logic system and a ternary logic system;
  - combine the plurality of motion-based inputs from the motion-based input system based on a weighted sum model to determine a motion-based indicator;
  - determine a propulsion-based indicator based on the status-based input;
  - estimate the severity of the accident based on the audio-based indicator, the vision-based indicator, the thermal-based indicator, the motion-based indicator, and the propulsion-based indicator based on a fuzzy logic severity estimation technique, wherein the severity of the accident is based at least in part on an amount of acceleration the vehicle experiences during the accident;
  - determine one or more remedial actions based on at least the severity of the accident; and
  - instruct the vehicle to execute the one or more remedial actions, wherein the one or more remedial actions include one or more of the following: contacting emergency personnel, unlocking doors of the vehicle, lowering windows of the vehicle, sending an SOS signal to one or more vehicles that are located within a predefined radius from the vehicle, and contacting non-emergency personnel.

16. The accident severity estimation system of claim 15, wherein the fuzzy logic severity estimation technique includes:
- assigning a corresponding fuzzy value to each indicator based on a membership function;
- evaluating the corresponding fuzzy value for each of the indicators based on one or more fuzzy logic rules to determine a fuzzified output value, wherein the fuzzified output value indicates the severity of the accident and a truth value corresponding to the severity; and converting the fuzzified output value into the severity of the accident based on the truth value.

17. The accident severity estimation system of claim 15, wherein the one or more controllers execute instructions to select one or more remedial actions based on the severity of the accident, a thermal incident indicator, a water incident indicator, and a root cause probability indicator.

18. An accident severity estimation system for estimating the severity of an accident for a vehicle, the accident severity estimation system comprising:

one or more microphones that capture a plurality of audio-based inputs indicative of verbal and non-verbal sounds emitted by one or more occupants of the vehicle;

a vision system that captures a plurality of vision-based inputs representing image data indicative of the occupants;

a motion-based input system that collects a plurality of motion-based inputs indicative of the motion of the vehicle during the accident;

a thermal incident system that collects a plurality of thermal inputs indicative of thermal events within the vehicle;

a propulsion system that provides a status-based input of the propulsion system of the vehicle; and one or more controllers in electronic communication with the one or more microphones, the vision system, the motion-based input system, the thermal incident system, and the propulsion system, the one or more controllers executing instructions to:

combine the plurality of audio-based inputs based on at least a 2-value logic system to determine an audio-based indicator, the plurality of vision-based inputs based on the at least 2-value logic system to determine a vision-based indicator, and the plurality of thermal inputs based on the at least 2-value logic system to determine a thermal-based indicator, wherein the 2-value logic system is one of a binary logic system and a ternary logic system;

combine the plurality of motion-based inputs from the motion-based input system based on a weighted sum model to determine a motion-based indicator;

determine a propulsion-based indicator based on the status-based input; and estimate the severity of the accident based on the audio-based indicator, the vision-based indicator, the thermal-based indicator, the motion-based indicator, and the propulsion-based indicator based on a fuzzy logic severity estimation technique, wherein the severity of the accident is based at least in part on an amount of acceleration the vehicle experiences during the accident, and wherein the fuzzy logic severity estimation technique includes:

assigning a corresponding fuzzy value to each indicator based on a membership function;

evaluating the corresponding fuzzy value for each of the indicators based on one or more fuzzy logic rules to determine a fuzzified output value, wherein the fuzzified output value indicates the severity of the accident and a truth value corresponding to the severity; and converting the fuzzified output value into the severity of the accident based on the truth value;

determine one or more remedial actions based on at least the severity of the accident; and instruct the vehicle to execute the one or more remedial actions, wherein the one or more remedial actions include one or more of the following: contacting emergency personnel, unlocking doors of the vehicle, lowering windows of the vehicle, sending an SOS signal to one or more vehicles that are located within a predefined radius from the vehicle, and contacting non-emergency personnel.

* * * * *